(12) United States Patent
Kojo et al.

(10) Patent No.: US 11,767,014 B2
(45) Date of Patent: Sep. 26, 2023

(54) VEHICLE CONTROL SYSTEM

(71) Applicants: TOYOTA JIDOSHA KABUSHIKI KAISHA, Toyota (JP); DENSO CORPORATION, Kariya (JP)

(72) Inventors: Takahiro Kojo, Gotenba (JP); Yoji Kunihiro, Susono (JP); Hisashi Kajita, Mishima (JP); Hisaya Akatsuka, Nagoya (JP); Hirotaka Tokoro, Inazawa (JP)

(73) Assignees: TOYOTA JIDOSHA KABUSHIKI KAISHA, Toyota (JP); DENSO CORPORATIO, Kariya (JP)

( * ) Notice: Subject to any disclaimer, the term of this patent is extended or adjusted under 35 U.S.C. 154(b) by 242 days.

(21) Appl. No.: 17/221,345

(22) Filed: Apr. 2, 2021

(65) Prior Publication Data
US 2021/0316724 A1 Oct. 14, 2021

(30) Foreign Application Priority Data
Apr. 10, 2020 (JP) .................................. 2020-071100

(51) Int. Cl.
| | |
|---|---|
| *B60W 30/12* | (2020.01) |
| *B60W 60/00* | (2020.01) |
| *B60W 10/20* | (2006.01) |
| *B60W 40/072* | (2012.01) |
| *G06V 20/56* | (2022.01) |

(52) U.S. Cl.
CPC ............ *B60W 30/12* (2013.01); *B60W 10/20* (2013.01); *B60W 40/072* (2013.01); *B60W 60/0053* (2020.02); *B60W 60/0057* (2020.02); *G06V 20/588* (2022.01); *B60W 2552/53* (2020.02); *B60W 2555/60* (2020.02)

(58) Field of Classification Search
CPC .... B60W 30/12; B60W 10/20; B60W 40/072; B60W 60/0053; B60W 60/0057; B60W 2552/53; B60W 2555/60; B60W 30/18163; B60W 2552/10; G06V 20/588
See application file for complete search history.

(56) References Cited

U.S. PATENT DOCUMENTS

| | | | |
|---|---|---|---|
| 2005/0270145 | A1 | 12/2005 | Kataoka et al. |
| 2006/0025918 | A1 | 2/2006 | Saeki |

(Continued)

FOREIGN PATENT DOCUMENTS

| | | |
|---|---|---|
| CN | 107933560 A | 4/2018 |
| CN | 109484404 A | 3/2019 |

(Continued)

*Primary Examiner* — Aniss Chad
*Assistant Examiner* — Nikki Marie M Molina
(74) *Attorney, Agent, or Firm* — Sughrue Mion, PLLC

(57) ABSTRACT

A vehicle control system includes an information acquirer configured to acquire vehicle surrounding information, and a controller configured to execute driving assistance control. The controller is configured to set a first line as a target traveling line when an operation status of the driving assistance control is ON. The controller is configured to set, when a driving switching request is made, the target traveling line to cause a vehicle to travel along a second line displaced from the first line by a predetermined displacement amount after a specific timing that is a timing when a predetermined time has elapsed from a requested timing.

8 Claims, 8 Drawing Sheets

(56) References Cited

U.S. PATENT DOCUMENTS

| | | | |
|---|---|---|---|
| 2017/0308094 A1* | 10/2017 | Abe | ............... G08G 1/0968 |
| 2018/0099667 A1 | 4/2018 | Abe et al. | |
| 2018/0173236 A1* | 6/2018 | Yashiro | ............ G05D 1/0214 |
| 2018/0273031 A1* | 9/2018 | Fujita | ................ G05D 1/021 |
| 2019/0077459 A1* | 3/2019 | Miura | ............. B62D 15/025 |
| 2019/0128408 A1 | 5/2019 | Kishi et al. | |
| 2020/0062244 A1* | 2/2020 | Iimura | ............ B60W 30/095 |

FOREIGN PATENT DOCUMENTS

| | | | |
|---|---|---|---|
| CN | 109747620 A | | 5/2019 |
| JP | 2006315491 A | | 11/2006 |
| JP | 2008-195402 A | | 8/2008 |
| JP | 4172434 B2 | | 10/2008 |
| JP | 2009-190464 A | | 8/2009 |
| JP | 4349210 B2 | | 10/2009 |
| JP | 2009248892 A | * | 10/2009 |
| JP | 2010-006279 A | | 1/2010 |
| JP | 2018-62244 A | | 4/2018 |
| JP | 2019-001350 A | | 1/2019 |
| JP | 2019-48570 A | | 3/2019 |
| JP | 2019-86038 A | | 6/2019 |
| JP | 2014-148293 A | | 8/2021 |

* cited by examiner

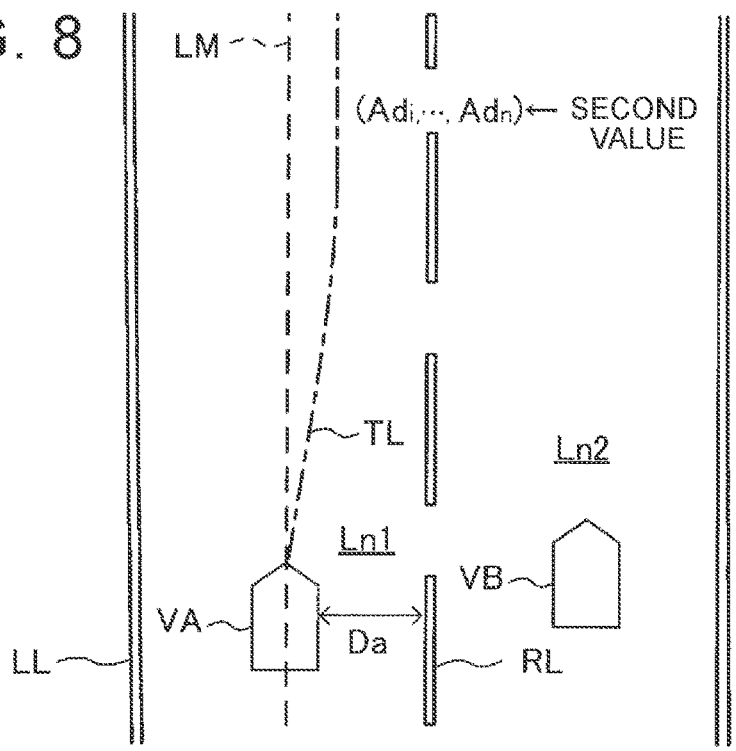
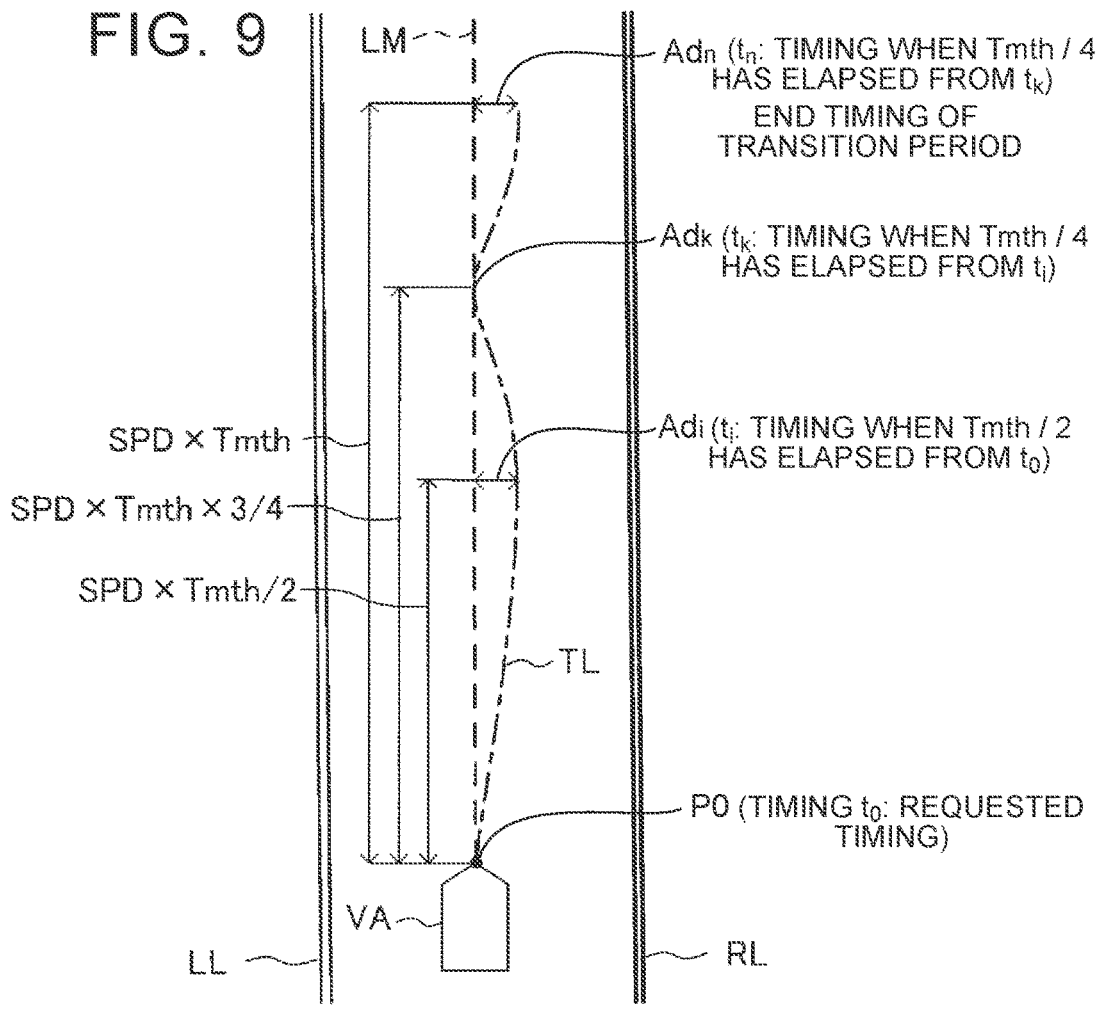

VEHICLE CONTROL SYSTEM

CROSS-REFERENCE TO RELATED APPLICATION

This application claims priority to Japanese Patent Application No. 2020-071100 filed on Apr. 10, 2020, incorporated herein by reference in its entirety.

BACKGROUND

1. Technical Field

The present disclosure relates to a vehicle control system configured to execute lane keeping control.

2. Description of Related Art

Hitherto, vehicle control systems execute lane keeping control for changing a steered angle of each steered wheel to cause a vehicle to travel along a target traveling line. The lane keeping control may be referred to as "lane keeping assist control" or "lane tracing assist control". The lane keeping control is hereinafter referred to as "LKA".

In addition, developments in recent years have provided vehicle control systems configured to execute autonomous driving control for autonomously controlling, for example, an acceleration of a vehicle and a steered angle of each steered wheel. The control such as the LKA and the autonomous driving control for assisting a part or entirety of the driving of the vehicle is hereinafter referred to as "driving assistance control".

In a related-art vehicle control system (hereinafter referred to as "related-art system"), a drive torque is applied to a steering mechanism when a driving switching request is made to switch a driving operation of a vehicle from driving assistance control to driver's manual driving (for example, Japanese Unexamined Patent Application Publication No. 2019-1350 (JP 2019-1350 A)). According to this configuration, the driver can be prompted to operate a steering wheel when the driving switching request is made.

SUMMARY

In the related-art system, when the driving switching request is made, the drive torque is applied to the steering mechanism without presetting a traveling trajectory of the vehicle by using a target traveling line. Therefore, the vehicle may wobble. For example, in the control in which the drive torque is simply applied to the steering mechanism, a lateral movement amount of the vehicle cannot be controlled appropriately. Therefore, the vehicle may have a lateral movement greater than expected by the driver.

The present disclosure can provide a vehicle control system in which, when a driving switching request is made, a driver can be prompted to operate a steering wheel while preventing an excessive increase in a lateral movement amount of a vehicle.

A vehicle control system according to a first aspect of the present disclosure includes an information acquirer and a controller. The information acquirer is configured to acquire vehicle surrounding information containing information related to a right lane marking line and a left lane marking line defining a traveling lane where a vehicle is traveling. The controller is configured to set a target traveling line based on the vehicle surrounding information, and execute driving assistance control including at least steering control for changing a steered angle of the vehicle to cause the vehicle to travel along the target traveling line. The controller is configured such that, when an operation status of the driving assistance control is ON, a first line connecting first positions in a width direction of the traveling lane defined based on the right lane marking line and the left lane marking line is set as the target traveling line. The controller is configured such that, when a driving switching request is made to request a change of the operation status of the driving assistance control from ON to OFF in a case where the operation status of the driving assistance control is ON, the target traveling line after a requested timing that is a timing when the driving switching request is made is set to cause the vehicle to travel along a second line displaced from the first line in a displacement direction that is a rightward direction or a leftward direction of the vehicle by a predetermined displacement amount after a specific timing that is a timing when a predetermined time has elapsed from the requested timing. The controller is configured to continue the driving assistance control in a period from the requested timing to a timing when a predetermined termination condition is satisfied.

According to the configuration described above, the lateral movement amount of the vehicle is controlled by using the target traveling line after the requested timing. Thus, the driver can be prompted to operate the steering wheel while preventing an excessive increase in the lateral movement amount of the vehicle.

In the aspect described above, the controller may be configured to set the displacement amount to secure a distance equal to or larger than a predetermined distance threshold as a distance between a side surface of the vehicle on a side in the displacement direction and the right lane marking line or the left lane marking line present on the side in the displacement direction.

According to the configuration described above, the vehicle is not excessively close to the lane marking line (right lane marking line or left lane marking line) present on the side in the displacement direction. Thus, the possibility of driver's anxiety can be reduced.

In the aspect described above, the controller may be configured to preset, as the displacement direction, the rightward direction or the leftward direction based on a traffic law in an area where the vehicle is traveling.

According to the configuration described above, the vehicle can be moved laterally in the direction based on the traffic law.

In the aspect described above, the information acquirer may be configured to acquire, as the vehicle surrounding information, information related to an adjacent lane adjoining the traveling lane. The controller may be configured to determine whether a first condition that the adjacent lane is present only on a right side or a left side of the traveling lane is satisfied at the requested timing. The controller may be configured such that, when the controller determines that the first condition is satisfied at the requested timing, the rightward direction or the leftward direction that is opposite to a direction in which the adjacent lane is present is set as the displacement direction.

When the adjacent lane is present, for example, another vehicle may travel along the adjacent lane from behind the vehicle. Therefore, when the vehicle laterally moves toward the adjacent lane, the driver feels anxiety. According to the configuration described above, the vehicle moves in the direction opposite to the direction in which the adjacent lane is present. Thus, the possibility of driver's anxiety can be reduced.

In the aspect described above, the information acquirer may be configured to acquire, as the vehicle surrounding information, information related to an adjacent lane adjoining the traveling lane, and information related to an object present on the adjacent lane. The controller may be configured to determine whether a second condition that the adjacent lane is present only on a right side or a left side of the traveling lane and the object is present on the adjacent lane is satisfied at the requested timing. The controller may be configured such that, when the controller determines that the second condition is satisfied at the requested timing, the rightward direction or the leftward direction that is opposite to a direction in which the adjacent lane is present is set as the displacement direction.

According to the configuration described above, when any object (for example, a four-wheel vehicle and/or a two-wheel vehicle) is actually present on the adjacent lane, the vehicle moves in the direction opposite to the direction in which the adjacent lane is present. Thus, the possibility of driver's anxiety can be reduced.

In the aspect described above, the information acquirer may be configured to acquire, as the vehicle surrounding information, information related to an adjacent lane adjoining the traveling lane, and information related to an object present on the adjacent lane.

The controller may be configured to preset the rightward direction or the leftward direction as the displacement direction. The controller may be configured such that, when the adjacent lane is present on a side in the displacement direction, the displacement amount when the object is present on the adjacent lane is set to a value smaller than a value of the displacement amount when the object is not present on the adjacent lane.

According to the configuration described above, when the adjacent lane is present on the side in the displacement direction and any object (for example, a four-wheel vehicle and/or a two-wheel vehicle) is present on the adjacent lane, the lateral movement amount of the vehicle decreases. The possibility of driver's anxiety can be reduced.

In the aspect described above, the controller may be configured to determine whether the vehicle is expected to travel along a curve in a period from the requested timing to a timing when a time corresponding to a predetermined time threshold (Tmth) has elapsed. The controller may be configured such that, when the controller determines that the vehicle is expected to travel along the curve in the period, the rightward direction or the leftward direction that is opposite to a direction in which the curve runs is set as the displacement direction.

In a situation in which the vehicle is traveling along a curve, a self-aligning torque may be generated in each tire. That is, a torque for causing the vehicle to travel straightforward again is generated in each tire. When the operation status of the driving assistance control is set to OFF while the vehicle is traveling along the curve, the vehicle is going to travel straightforward again due to the self-aligning torque. Therefore, the vehicle may suddenly move outward from the curve. According to the configuration described above, the controller displaces the vehicle from the first line in a direction opposite to the direction of the curve (that is, a direction corresponding to an outward direction of the curve). Since the vehicle is displaced outward from the curve, the driver can be prompted to operate the steering wheel in a direction corresponding to an inward direction of the curve. In response to the displacement of the vehicle, the driver operates the steering wheel in the direction corresponding to the inward direction of the curve. That is, the driver operates the steering wheel in a direction in which the self-aligning torque is canceled out. Thus, it is possible to reduce the possibility that the vehicle suddenly moves outward from the curve when the operation status of the driving assistance control is set to OFF.

In the aspect described above, the controller may be configured such that, when the driving switching request is made, the target traveling line is set to cause the vehicle to travel through a position spaced away from the first line in the displacement direction by a first displacement amount at a first timing when a first time has elapsed from the requested timing, travel through a position spaced away from the first line in the displacement direction by a second displacement amount at a second timing when a second time has elapsed from the first timing, and travel through a position spaced away from the first line in the displacement direction by a third displacement amount at a third timing when a third time has elapsed from the second timing. The second displacement amount may be smaller than the first displacement amount and the third displacement amount. The first displacement amount may be equal to or smaller than the third displacement amount.

According to the configuration described above, the vehicle laterally moves multiple times. Thus, the driver can be prompted to operate the steering wheel.

In the aspect described above, the first position may be a central position between the right lane marking line and the left lane marking line in the width direction of the traveling lane.

In the aspect described above, the controller described above may be implemented by a microprocessor programmed to perform one or more functions described herein. In the aspect described above, the controller described above may entirely or partially be implemented by hardware including one or more application-specific integrated circuits, that is, ASICs. In the description above, constituent elements corresponding to those in one or more embodiments described later are accompanied with parenthesized names and/or reference symbols used in the embodiments. The constituent elements are not limited to those in the embodiments defined by the names and/or the reference symbols.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a plan for describing a modified example of the method for setting the target traveling line when the driving switching request is made;

FIG. 9 is a plan for describing a modified example of the method for setting the target traveling line when the driving switching request is made;

DETAILED DESCRIPTION OF EMBODIMENTS

First Embodiment

Figure 1:
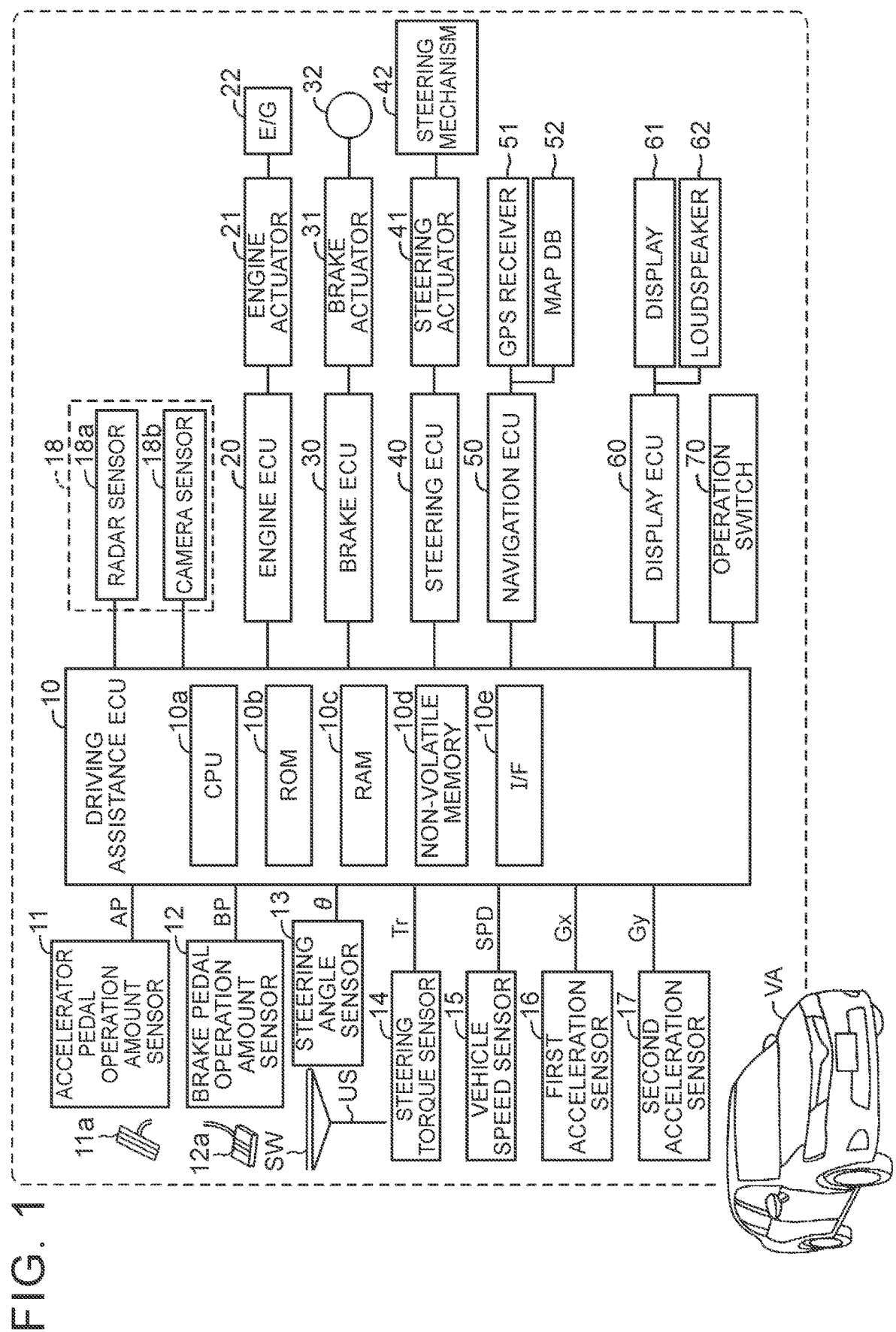
FIG. 1 is a schematic configuration diagram of a vehicle control system according to a first embodiment.

As illustrated in FIG. 1, a vehicle control system according to a first embodiment (may hereinafter be referred to as "first system") is applied to a vehicle VA. The vehicle control system includes a driving assistance ECU 10, an engine ECU 20, a brake ECU 30, a steering ECU 40, a navigation ECU 50, and a display ECU 60.

The ECUs are electric control units mainly including microcomputers, and are connected together via a controller area network (CAN) so that information can be transmitted to and received from one another. The microcomputer herein includes a central processing unit (CPU), a read-only memory (ROM), a random-access memory (RAM), a non-volatile memory, and an interface (I/F). The CPU implements various functions by executing instructions (programs or routines) stored in the ROM. For example, the driving assistance ECU 10 includes a microcomputer including a CPU 10a, a ROM 10b, a RAM 10c, a non-volatile memory 10d, and an interface (I/F) 10e.

The driving assistance ECU 10 is connected to sensors described later (including switches), and receives detection signals or output signals from the sensors.

An accelerator pedal operation amount sensor 11 detects an operation amount of an accelerator pedal 11a (accelerator operation amount), and outputs a signal indicating an accelerator pedal operation amount AP. A brake pedal operation amount sensor 12 detects an operation amount of a brake pedal 12a, and outputs a signal indicating a brake pedal operation amount BP.

A steering angle sensor 13 detects a steering angle of a steering wheel SW, and outputs a signal indicating a steering angle θ. The value of the steering angle θ is a positive value when the steering wheel SW is rotated in a first direction (leftward direction) from a predetermined reference position (neutral position), and is a negative value when the steering wheel SW is rotated in a second direction (rightward direction) opposite to the first direction from the predetermined reference position. The neutral position is a reference position at which the steering angle θ is "0", and is a position of the steering wheel SW when the vehicle VA travels straightforward. A steering torque sensor 14 detects a steering torque applied to a steering shaft US through a driver's operation for the steering wheel SW (steering operation), and outputs a signal indicating a steering torque Tr. The value of the steering torque Tr is a positive value when the steering wheel SW is rotated in the first direction (leftward direction), and is a negative value when the steering wheel SW is rotated in the second direction (rightward direction).

A vehicle speed sensor 15 detects a traveling speed of the vehicle VA (vehicle speed), and outputs a signal indicating a vehicle speed SPD. A first acceleration sensor 16 detects an acceleration Gx in a longitudinal direction of the vehicle VA, and outputs a signal indicating the acceleration Gx. A second acceleration sensor 17 detects an acceleration Gy in a lateral direction of the vehicle VA, and outputs a signal indicating the acceleration Gy.

A surrounding sensor 18 detects surrounding conditions of the vehicle VA. The surrounding sensor 18 acquires information related to roads around the vehicle VA (including a traveling lane where the vehicle VA is traveling and an adjacent lane adjoining the traveling lane), and information related to three-dimensional objects on the roads. Examples of the three-dimensional object include moving objects such as a pedestrian, a four-wheel vehicle, and a two-wheel vehicle, and stationary objects such as a guardrail and a fence. The three-dimensional object may hereinafter be referred to as "target". The surrounding sensor 18 includes a radar sensor 18a and a camera sensor 18b.

For example, the radar sensor 18a radiates a radio wave in a millimeter wave band (hereinafter referred to as "millimeter wave") to an area around the vehicle VA, and receives the millimeter wave reflected by a target in a radiation range (that is, a reflected wave). The area around the vehicle VA includes an area ahead of the vehicle VA, an area behind the vehicle VA, an area on the right of the vehicle VA, and an area on the left of the vehicle VA. The radar sensor 18a determines whether a target is present, and calculates information indicating a relative relationship between the vehicle VA and the target. The information indicating the relative relationship between the vehicle and the target contains a distance between the vehicle VA and the target, an azimuth (or a position) of the target relative to the vehicle VA, and a relative speed between the vehicle VA and the target. The information acquired from the radar sensor 18a (including the information indicating the relative relationship between the vehicle VA and the target) is referred to as "target information".

The camera sensor 18b acquires image data by imaging a landscape ahead of the vehicle. The camera sensor 18b recognizes a plurality of lane marking lines defining a traveling lane and an adjacent lane based on the image data. Further, the camera sensor 18b calculates parameters indicating the shapes of the traveling lane and the adjacent lane (for example, curvatures), and parameters indicating a positional relationship between the vehicle VA and the traveling lane. Examples of the parameter indicating the positional relationship between the vehicle VA and the traveling lane include a distance between a central position of the vehicle VA in a vehicle width direction and an arbitrary position on a right lane line or a left lane line. The information acquired by the camera sensor 18b is referred to as "lane information". The camera sensor 18b may determine whether a target is present and calculate target information based on the image data.

The surrounding sensor 18 outputs the information containing "target information and lane information" related to the surrounding conditions of the vehicle to the driving assistance ECU 10 as "vehicle surrounding information". The surrounding sensor 18 may be referred to as "information acquirer configured to acquire vehicle surrounding information".

The engine ECU 20 is connected to an engine actuator 21. The engine actuator 21 includes a throttle valve actuator configured to change an opening degree of a throttle valve of an internal combustion engine 22. The engine ECU 20 can change a torque to be generated by the internal combustion engine 22 by driving the engine actuator 21. The torque generated by the internal combustion engine 22 is transmitted to driving wheels via a transmission (not illustrated). By controlling the engine actuator 21, the engine ECU 20 can control a driving force of the vehicle to change an acceleration condition (acceleration). The vehicle may have an electric motor as the vehicle drive source in place of or in addition to the internal combustion engine 22. In this case, the engine ECU 20 can control the driving force of the vehicle VA by changing a torque to be generated by the internal combustion engine and/or the electric motor.

The brake ECU 30 is connected to a brake actuator 31. The brake actuator 31 includes a hydraulic circuit. The hydraulic circuit includes a master cylinder, brake fluid channels, a plurality of valves, a pump, and a pump driving motor. In response to an instruction from the brake ECU 30, the brake actuator 31 adjusts a hydraulic pressure to be supplied to wheel cylinders provided in a brake mechanism 32. With the hydraulic pressure, the wheel cylinders generate frictional braking forces for the wheels. By controlling the brake actuator 31, the brake ECU 30 can control the braking force of the vehicle to change the acceleration condition (deceleration, that is, negative acceleration).

The steering ECU 40 is connected to a steering actuator 41. The steering actuator 41 includes a steering operation motor. The motor is built into a steering mechanism 42. The steering mechanism 42 turns steered wheels (right front wheel and left front wheel) in response to a rotational operation for the steering wheel SW. The steering mechanism 42 includes the steering wheel SW, the steering shaft US coupled to the steering wheel SW, and a steering gear mechanism. In response to an instruction from the steering ECU 40, the steering actuator 41 generates an assist torque for assisting a driver's operation for the steering wheel SW, and an automatic steering torque described later for changing a steered angle of each steered wheel.

The navigation ECU 50 is connected to a Global Positioning System (GPS) receiver 51 and a map database (DB) 52. The GPS receiver 51 receives a GPS signal for detection of "latitude and longitude" of a place where the vehicle is located. The map DB 52 stores map information. The map information contains information related to roads. The information related to roads contains positions of lane marking lines defining a traveling lane, a width of the traveling lane defined by the lane marking lines, and a curvature of the traveling lane. The navigation ECU 50 can acquire the map information and the information on the place where the vehicle is located (latitude and longitude), and transmit those pieces of information to other ECUs (for example, the driving assistance ECU 10). The driving assistance ECU 10 may acquire the map information from a system other than the navigation system.

The display ECU 60 is connected to a display 61 and a loudspeaker 62. The display 61 is a multi-information display provided in front of a driver's seat. When a voice command is received from the driving assistance ECU 10, the loudspeaker 62 generates voice in response to the voice command. The display 61 and the loudspeaker 62 may be referred to collectively as "notifier".

An operation switch 70 is operated by the driver. By operating the operation switch 70, the driver can set an operation status of vehicle-to-vehicle follow distance control described later to ON or OFF. The vehicle-to-vehicle follow distance control may be referred to as "adaptive cruise control". The vehicle-to-vehicle follow distance control is hereinafter referred to simply as "ACC". By operating the operation switch 70, the driver can further set an operation status of LKA to ON or OFF. The LKA is one type of driving assistance control. The operation status of the LKA is referred to as "driving assistance operation status".

ACC

The driving assistance ECU 10 is configured to execute known ACC (see, for example, Japanese Unexamined Patent Application Publication No. 2014-148293 (JP 2014-148293 A), Japanese Unexamined Patent Application Publication No. 2006-315491 (JP 2006-315491 A), and Japanese Patent No. 4172434 (JP 4172434 B)).

The ACC includes two types of control, which are constant speed traveling control and preceding vehicle following control. In the constant speed traveling control, the acceleration of the vehicle VA is adjusted so that the traveling speed of the vehicle VA is equal to a target speed (set speed) Vset without requiring operations for the accelerator pedal 11a and the brake pedal 12a. In the preceding vehicle following control, the vehicle VA is caused to follow a preceding vehicle (follow target vehicle) while keeping a vehicle-to-vehicle distance between the follow target vehicle and the vehicle VA at a target vehicle-to-vehicle distance Dset without requiring operations for the accelerator pedal 11a and the brake pedal 12a. The follow target vehicle is a vehicle traveling immediately ahead of the vehicle VA in an area ahead of the vehicle VA.

When an operation status of the ACC is set to ON by operating the operation switch 70, the driving assistance ECU 10 determines whether the follow target vehicle is present based on target information. When the driving assistance ECU 10 determines that the follow target vehicle is not present, the driving assistance ECU 10 executes the constant speed traveling control. The driving assistance ECU 10 controls the engine actuator 21 by using the engine ECU 20 to control the driving force so that the vehicle speed SPD is equal to the target speed Vset, and controls the brake actuator 31 by using the brake ECU 30 to control the braking force as necessary.

When the driving assistance ECU 10 determines that the follow target vehicle is present, the driving assistance ECU 10 executes the preceding vehicle following control. The driving assistance ECU 10 calculates the target vehicle-to-vehicle distance Dset by multiplying a target vehicle-to-vehicle time tw by the vehicle speed SPD. The target vehicle-to-vehicle time tw is set by using a vehicle-to-vehicle time switch (not illustrated). The driving assistance ECU 10 controls the engine actuator 21 by using the engine ECU 20 to control the driving force so that the vehicle-to-vehicle distance between the vehicle VA and the follow target vehicle is equal to the target vehicle-to-vehicle distance Dset, and controls the brake actuator 31 by using the brake ECU 30 to control the braking force as necessary.

LKA

The driving assistance ECU 10 is configured to execute known LKA as one type of the driving assistance control. When the operation status of the ACC is ON, the driving assistance ECU 10 can set the driving assistance operation status (operation status of the LKA) to ON in response to an operation for the operation switch 70.

The LKA is control for changing the steered angle of each steered wheel of the vehicle VA to cause the vehicle VA to travel along a target traveling line set by using lane marking lines (steering control). The LKA itself is known (see, for example, Japanese Unexamined Patent Application Publication No. 2008-195402 (JP 2008-195402 A), Japanese Unexamined Patent Application Publication No. 2009-190464 (JP 2009-190464 A), Japanese Unexamined Patent Application Publication No. 2010-6279 (JP 2010-6279 A), and Japanese Patent No. 4349210 (JP 4349210 B)).

Figure 2:
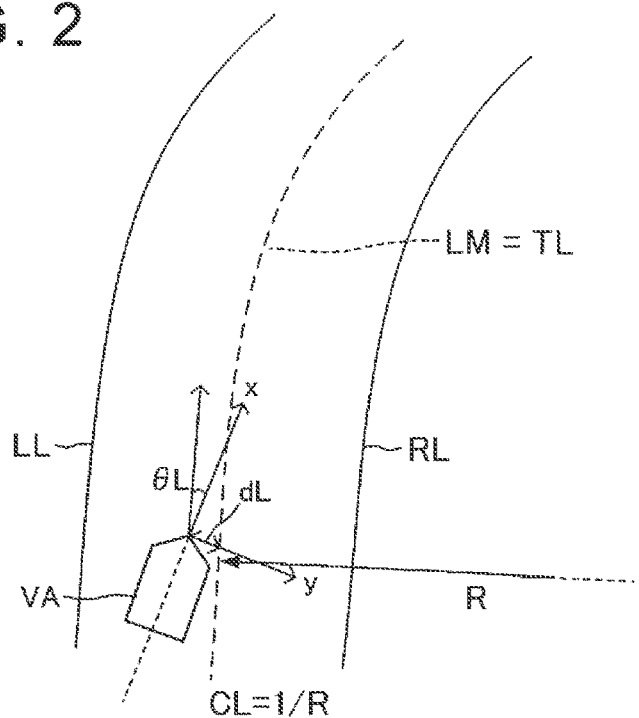
FIG. 2 is a plan for describing lane keeping control (LKA) using a target traveling line set based on a central line of a traveling lane where a vehicle is traveling.

As illustrated in FIG. 2, the driving assistance ECU 10 acquires information about "right lane marking line RL and left lane marking line LL" of a traveling lane where the vehicle VA is traveling based on lane information contained in vehicle surrounding information. The driving assistance ECU 10 estimates, as "lane central line LM (first line)", a line connecting "central positions (first positions)" between the right lane marking line RL and the left lane marking line LL in a road width direction (width direction of the traveling lane). The driving assistance ECU 10 sets the central line LM as a target traveling line TL.

In another example, the driving assistance ECU 10 may set, as the target traveling line TL, a line connecting positions displaced by a predetermined distance toward the right lane marking line RL or the left lane marking line LL from the central line LM.

The driving assistance ECU 10 calculates LKA control parameters necessary to execute the LKA. As illustrated in FIG. 2, the LKA control parameters include a curvature CL of the target traveling line TL (=a reciprocal of a curvature radius R of the central line LM), a distance dL, and a yaw angle θL. In FIG. 2, an x-axis extends in the longitudinal direction of the vehicle VA, and a y-axis is orthogonal to the x-axis. The distance dL is a distance in a y-axis direction (substantially in the road width direction) between the target traveling line TL and the position of the vehicle VA. In this example, the "position of vehicle" is a central position of the front end of the vehicle VA in the vehicle width direction. The "position of vehicle" may be any other position on the vehicle (for example, a central position between the right front wheel and the left front wheel in plan view or a geometrically central position of the vehicle in plan view). The yaw angle θL is an angle of a longitudinal axis of the vehicle VA with respect to the target traveling line TL. For example, the curvature CL takes a positive value when making a turn to the left, and a negative value when making a turn to the right. For example, the distance dL takes a positive value when the vehicle VA deviates rightward from the target traveling line TL, and a negative value when the vehicle VA deviates leftward from the target traveling line TL. For example, the yaw angle θL takes a positive value when the vehicle VA deviates rightward from the target traveling line TL, and a negative value when the vehicle VA deviates leftward from the target traveling line TL.

The driving assistance ECU 10 calculates an automatic steering torque Btr by using the LKA control parameters (CL, dL, θL) to cause the position of the vehicle VA to coincide with the target traveling line TL. The automatic steering torque Btr is applied to the steering mechanism 42 by driving the steering actuator 41 without a driver's operation for the steering wheel SW. For example, the driving assistance ECU 10 calculates the automatic steering torque Btr based on Expression 1.

$$Btr = K1 \cdot (SPD^2 \cdot CL) + K2 \cdot dL + K3 \cdot \theta L \quad \text{(Expression 1)}$$

The symbols "K1", "K2", and "K3" represent control gains.

The driving assistance ECU 10 controls the steering actuator 41 by using the steering ECU 40 so that an actual torque applied to the steering mechanism 42 is equal to the automatic steering torque Btr. That is, the driving assistance ECU 10 executes steering control. When the automatic steering torque Btr is a positive value, the steering actuator 41 applies a torque to the steering mechanism 42 to turn the steered wheels to the left. When the automatic steering torque Btr is a negative value, the steering actuator 41 applies a torque to the steering mechanism 42 to turn the steered wheels to the right.

The driving assistance ECU 10 may determine the automatic steering torque Btr by applying the LKA control parameters (CL, dL, θL) to a predetermined automatic steering torque map MBtr(CL, dL, θL). Alternatively, the driving assistance ECU 10 may calculate a target steering angle by using the LKA control parameters (CL, dL, θL) to cause the position of the vehicle VA to coincide with the target traveling line TL, and control the steering actuator 41 so that an actual steering angle is equal to the target steering angle. The driving assistance ECU 10 may determine the target steering angle by applying the LKA control parameters (CL, dL, θL) to a predefined map.

Driving Switching Request

When the driving assistance operation status is ON, the driving assistance ECU 10 determines whether a driving switching request is made to request a change of the driving assistance operation status from ON to OFF. The driving switching request is made in response to detection of a predetermined abnormality. The predetermined abnormality means an LKA system abnormality including an abnormality of any component of the vehicle control system (for example, the engine actuator 21 or the brake actuator 31). The driving assistance ECU 10 monitors whether the LKA system abnormality occurs based on a routine (not illustrated). The driving switching request may be made based on the map information or the like in a situation in which the vehicle VA reaches a predetermined place such as a tollgate of a toll road or an end of a limited highway.

A timing when the driving switching request is made is hereinafter referred to as "requested timing". A period until an elapsed time Tep from the requested timing reaches a predetermined time threshold Tmth is a transition period during which the driving operation (steering control) makes transition from the LKA to the driver. In the transition period, the LKA is continued (that is, the driving assistance operation status is kept ON).

The driving assistance ECU 10 determines whether, in the transition period, the driver has come into a state in which the driver can operate the steering wheel SW (hereinafter referred to as "drivable state"). Specifically, the driving assistance ECU 10 determines whether a magnitude |Tr| of the steering torque Tr detected by the steering torque sensor 14 is equal to or larger than a predetermined torque threshold Trth in the transition period. When the magnitude |Tr| of the steering torque Tr is equal to or larger than the torque threshold Trth, the driving assistance ECU 10 determines that the driver has come into the drivable state.

Until the driving assistance ECU 10 determines that the driver has come into the drivable state in the transition period, the driving assistance ECU 10 executes an alerting process for prompting the driver to operate the steering wheel SW. The driving assistance ECU 10 sets the driving assistance operation status to OFF (that is, terminates the LKA) at a timing when the driving assistance ECU 10 determines that the driver has come into the drivable state in the transition period. Thus, the driving assistance ECU 10 continues the LKA from the requested timing to the timing when the driving assistance ECU 10 determines that the driver has come into the drivable state.

When the driver does not come into the drivable state before an end timing of the transition period (timing when the elapsed time Tep reaches the time threshold Tmth), the driving assistance ECU 10 sets the driving assistance operation status to OFF at the end timing of the transition period.

In this case, the driving assistance ECU 10 executes limp home control. In the limp home control, the steered angle of each steered wheel of the vehicle VA is automatically changed to move the vehicle VA to a limp home place (for example, a shoulder of a road). The limp home control may include control for automatically changing the acceleration so that the vehicle speed SPD is "0" at a timing when the vehicle VA reaches the limp home place. The limp home control is referred to also as "minimum risk maneuver (MRM) control".

LKA when Driving Switching Request is Made

In the related-art system described above, when the driving switching request is made, the drive torque is applied to the steering mechanism without setting the target traveling line. Therefore, the vehicle may wobble. The vehicle may have a lateral movement greater than expected by the driver. As a result, the driver may feel anxiety.

In view of the above, when the driving switching request is made, the driving assistance ECU 10 sets a target traveling line TL for displacing the vehicle VA from the central line LM. Specifically, the driving assistance ECU 10 sets the target traveling line TL to cause the vehicle VA to travel along a second line displaced from the central line LM (first line) in a displacement direction Dr by a predetermined displacement amount (for example, Da/2 described later) after a specific timing (timing $t_1$ described later). The specific timing is a timing when a predetermined time has elapsed from the requested timing.

Figure 3:
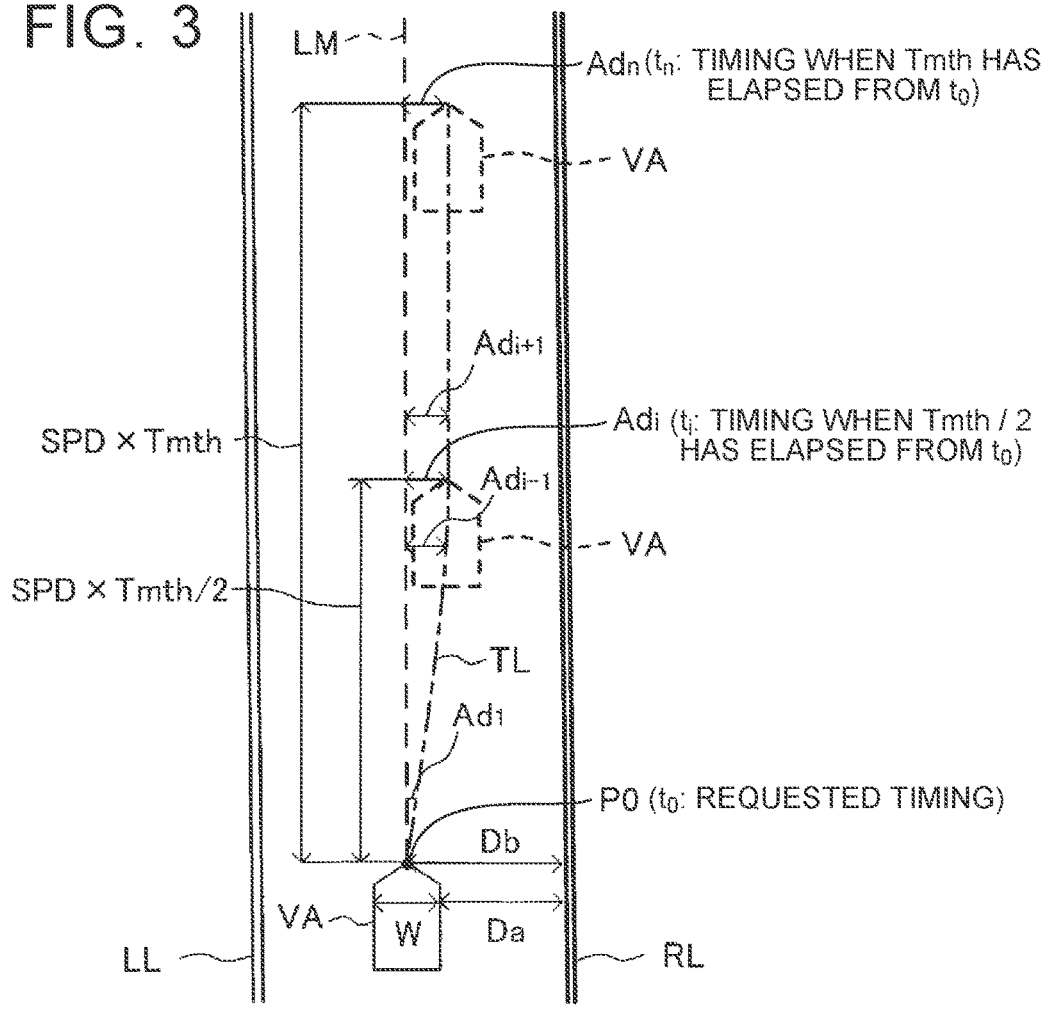
FIG. 3 is a plan for describing an example of a method for setting the target traveling line when a driving switching request is made.

In an example illustrated in FIG. 3, the vehicle VA is traveling at a position P0 at a timing $t_0$. It is assumed that the driving switching request is made at the timing $t_0$. A timing $t_n$ is a timing when Tmth has elapsed from the timing $t_0$, and is the end timing of the transition period. The driving assistance ECU 10 assumes that the vehicle VA travels while keeping a vehicle speed SPD at the timing to in the transition period. According to this assumption, the vehicle VA reaches, at the timing $t_n$, a position ahead of the position P0 by a distance "SPD×Tmth". Thus, the driving assistance ECU 10 sets again a target traveling line TL from the current position P0 to the position ahead of the position P0 by the distance "SPD×Tmth".

The driving assistance ECU 10 first sets the displacement direction (shift direction) Dr. The displacement direction Dr is a direction in which the vehicle VA is displaced from the central line LM (rightward direction or leftward direction in the width direction of the traveling lane). In this example, the displacement direction Dr is preset to the rightward direction.

Next, the driving assistance ECU 10 sets "target displacement amount (target shift amount) Ad from central line LM in displacement direction Dr" in a period from the timing $t_0$ to the timing $t_n$. The target displacement amount Ad is set for every predetermined time interval Δt in the period from the timing $t_0$ to the timing $t_n$. The time interval Δt is defined by "Tmth/n". The symbol "n" represents a predetermined positive integer. In this example, n target displacement amounts Ad set for the individual time intervals Δt from the timing to are represented by ($Ad_1$, . . . , $Ad_n$). When the target displacement amount is represented by "$Ad_m$" (1≤m≤n), this target displacement amount is a target displacement amount at a timing $t_m$ (timing after m×Δt from the timing $t_0$).

The driving assistance ECU 10 first determines a target displacement amount $Ad_i$ at the timing $t_i$ when the predetermined time has elapsed from the timing $t_0$. For example, the predetermined time is "Tmth/2". The target displacement amount $Ad_i$ is a displacement amount from the central line LM at a position ahead of the position P0 by a distance "SPD×Tmth/2".

The driving assistance ECU 10 calculates, based on Expression 2, a distance Da between a side surface of the vehicle VA on a side in the displacement direction Dr (that is, a right-side surface of the vehicle VA) and a lane marking line present on the side in the displacement direction Dr (right lane marking line RL). In Expression 2, "Db" represents a distance between the central position of the front end of the vehicle VA in the vehicle width direction and the right lane marking line RL, and "W" represents a width of the vehicle VA.

$$Da=Db-W/2 \qquad \text{(Expression 2)}$$

The driving assistance ECU 10 sets target displacement amounts ($Ad_1$, . . . , $Ad_i$) in a period from a timing $t_1$ to the timing $t_i$ so that the target displacement amount $Ad_i$ at the timing $t_i$ is "half of Da (that is, Da/2)". The values of the target displacement amounts ($Ad_1$, . . . , $Ad_i$) are set so that the value gradually increases from "0" with an elapse of time and the value at the timing $t_i$ ($Ad_i$) is "Da/2". Further, the driving assistance ECU 10 sets target displacement amounts ($Ad_{i+1}$, . . . , $Ad_n$) in a period from a timing $t_{i+1}$ to the timing $t_n$ to "Da/2".

The driving assistance ECU 10 sets, as the target traveling line TL after the requested timing, a line displaced from the central line LM (first line) in the displacement direction Dr based on the target displacement amounts Ad ($Ad_1$, . . . , $Ad_n$). The set target traveling line is referred to as "transition-period target traveling line TL".

When the driving switching request is made, the driving assistance ECU 10 executes the steering control based on the transition-period target traveling line TL. According to this configuration, the vehicle VA reaches a position displaced from the central line LM in the rightward direction (displacement direction Dr) by "Da/2" (hereinafter referred to as "first displaced position") at the timing $t_i$ in the transition period. The vehicle VA travels along the first displaced positions in a period from the timing $t_i$ to the timing $t_n$. Since the vehicle VA travels along the positions displaced from the central line LM in the rightward direction, the driver can be prompted to operate the steering wheel SW.

In order not to bring the vehicle VA excessively close to the right lane marking line RL while prompting the driver to operate the steering wheel SW, the target displacement amount $Ad_i$ at the timing $t_i$ may be set to a value equal to or smaller than "Da/2". According to this configuration, a distance equal to or larger than "Da/2" is secured between the right-side surface of the vehicle VA and the right lane marking line RL after the requested timing (timing $t_0$). Since the vehicle VA is not excessively close to the right lane marking line RL, the possibility of driver's anxiety can be reduced.

The lateral movement of the vehicle VA is started from the requested timing (timing to), and the vehicle VA reaches the first displaced position at the timing Thus, the driver can be prompted to operate the steering wheel SW in an early stage of the transition period. After the lateral movement of the vehicle VA, a time "Tmth/2" is secured for the driver to operate the steering wheel SW. Thus, it is possible to increase a possibility that the driver comes into the drivable state before the end timing of the transition period (timing $t_m$).

Operation Example

Next, operations of the CPU of the driving assistance ECU 10 (may be referred to simply as "CPU") are described.

When the operation status of the ACC is set to ON by operating the operation switch 70, the CPU executes the ACC based on a routine (not illustrated). The CPU executes "driving assistance start/termination determination routine" illustrated in FIG. 4 every time a predetermined time has elapsed during the execution of the ACC.

The CPU executes a routine (not illustrated) every time a predetermined time has elapsed to receive detection signals or output signals from various sensors (11 to 18) and the operation switch 70, and store the signals in the RAM.

Figure 4:
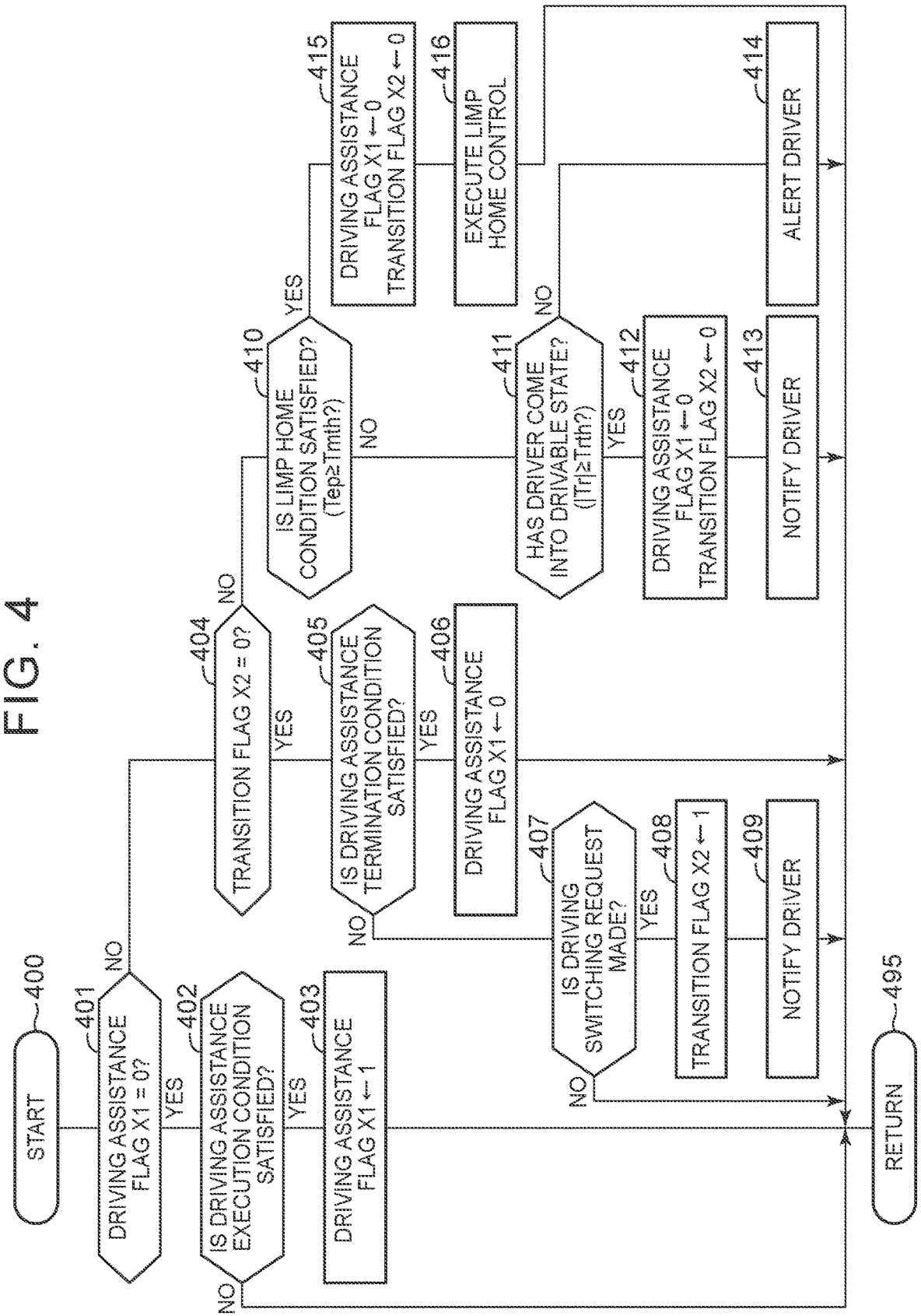
FIG. 4 is a flowchart illustrating "driving assistance start/termination determination routine" to be executed by a driving assistance electric control unit (ECU) according to the first embodiment.

At a predetermined timing, the CPU starts the routine of FIG. 4 from Step 400, and proceeds to Step 401. The CPU determines whether the value of a driving assistance flag X1 is "0". The driving assistance flag X1 indicates that the driving assistance operation status is ON when the value is "1", and that the driving assistance operation status is OFF when the value is "0". The driving assistance flag X1 and another flag X2 described later are set to "0" in an initialization routine executed by the CPU when an ignition switch (not illustrated) is changed from an OFF position to an ON position.

Assuming that the driving assistance operation status is OFF, the value of the driving assistance flag X1 is "0". In this case, the CPU determines "Yes" in Step 401, and proceeds to Step 402. The CPU determines whether a condition to execute the driving assistance control (hereinafter referred to as "driving assistance execution condition") is satisfied.

The driving assistance execution condition is satisfied when both Condition 1 and Condition 2 are satisfied. Another condition may be added as one of the conditions to be satisfied for satisfaction of the driving assistance execution condition. The same applies to other conditions described later.

(Condition 1) Selection is made to set the driving assistance operation status to ON by operating the operation switch 70.

(Condition 2) The right lane marking line RL and the left lane marking line LL are detected in a range from the vehicle VA to a distant position.

When the driving assistance execution condition is not satisfied, the CPU determines "No" in Step 402, and proceeds directly to Step 495 to temporarily terminate this routine.

When the driving assistance execution condition is satisfied, the CPU determines "Yes" in Step 402, and proceeds to Step 403. The CPU sets the value of the driving assistance flag X1 to "1". Then, the CPU proceeds to Step 495 to temporarily terminate this routine. Therefore, the CPU determines "Yes" in Step 501 of a routine of FIG. 5 described later, and determines "Yes" in Step 601 of a routine of FIG. 6 described later. Thus, the LKA is started.

After the driving assistance operation status is set to ON, the CPU restarts the routine of FIG. 4 from Step 400. Then, the CPU determines "No" in Step 401, and proceeds to Step 404. In Step 404, the CPU determines whether the value of a transition flag X2 is "0". The transition flag X2 indicates that a current timing is in the transition period when the value is "1".

It is assumed that the driving assistance operation status is ON and the driving switching request is not made. In this case, the value of the transition flag X2 is "0". The CPU determines "Yes" in Step 404, and proceeds to Step 405. The CPU determines whether a condition to terminate the driving assistance control (hereinafter referred to as "driving assistance termination condition") is satisfied. The driving assistance termination condition is satisfied when selection is made to set the driving assistance operation status to OFF by operating the operation switch 70.

When the driving assistance termination condition is satisfied, the CPU determines "Yes" in Step 405, and proceeds to Step 406. The CPU sets the value of the driving assistance flag X1 to "0". Then, the CPU proceeds to Step 495 to temporarily terminate this routine. Therefore, the CPU determines "No" in Step 501 of the routine of FIG. 5 described later, and determines "No" in Step 601 of the routine of FIG. 6 described later. Thus, the LKA is terminated.

When the driving assistance termination condition is not satisfied, the CPU determines "No" in Step 405, and proceeds to Step 407. The CPU determines whether the driving switching request is made. When the driving switching request is not made, the CPU determines "No" in Step 407, and proceeds directly to Step 495 to temporarily terminate this routine.

When the driving switching request is made, the CPU determines "Yes" in Step 407, and sequentially performs the following processes of Step 408 and Step 409. Then, the CPU proceeds to Step 495 to temporarily terminate this routine.

Step 408: The CPU sets the value of the transition flag X2 to "1" to indicate that the current timing is in the transition period.

Step 409: By using the display ECU 60, the CPU causes the display 61 to display a message indicating "switching to transition period for transition of driving assistance operation status from ON to OFF", and causes the loudspeaker 62 to output the message by voice.

The CPU restarts the routine of FIG. 4 from Step 400. Then, the CPU determines "No" in Step 401, determines "No" in Step 404, and proceeds to Step 410. In Step 410, the CPU determines whether a limp home condition is satisfied. The limp home condition is satisfied when the elapsed time Tep from the requested timing (timing when the value of the transition flag X2 is set to "1") is equal to or larger than the time threshold Tmth.

Assuming that the current timing is a timing immediately after the value of the transition flag X2 is set to "1", the limp home condition is not satisfied. Thus, the CPU determines "No" in Step 410, and proceeds to Step 411. The CPU determines whether the driver has come into the drivable state. Specifically, the CPU determines whether the magnitude |Tr| of the steering torque Tr is equal to or larger than the torque threshold Trth.

During the execution of the LKA, the driver does not generally operate the steering wheel SW. In many cases, the magnitude |Tr| of the steering torque Tr is therefore smaller than the torque threshold Trth at the start timing of the transition period. In this case, the CPU determines "No" in Step 411, and proceeds to Step 414. The CPU causes the display 61 to display an alert message for prompting the driver to "operate steering wheel SW", and causes the loudspeaker 62 to output the alert message by voice. Then, the CPU proceeds to Step 495 to temporarily terminate this routine.

It is assumed that the magnitude |Tr| of the steering torque Tr is equal to or larger than the torque threshold Trth through the driver's operation for the steering wheel SW. In this case, the CPU proceeds to Step 411 through Step 401, Step 404, and Step 410. Then, the CPU determines "Yes", and sequentially performs the following processes of Step 412 and Step 413. Then, the CPU proceeds to Step 495 to temporarily terminate this routine.

Step 412: The CPU sets the value of the driving assistance flag X1 to "0", and sets the value of the transition flag X2 to "0". Thus, the LKA is terminated.

Step 413: The CPU causes the display 61 to display a message indicating "switching of driving assistance operation status to OFF", and causes the loudspeaker 62 to output the message by voice.

It is assumed that the driver does not operate the steering wheel SW in the transition period. When the CPU proceeds to Step 410 through Step 401 and Step 404 at the end timing of the transition period, the CPU determines "Yes", and sequentially performs the following processes of Step 415 and Step 416. Then, the CPU proceeds to Step 495 to temporarily terminate this routine.

Step 415: The CPU sets the value of the driving assistance flag X1 to "0", and sets the value of the transition flag X2 to "0". Thus, the LKA is terminated.

Step 416: The CPU executes the limp home control as described above.

Figure 5:
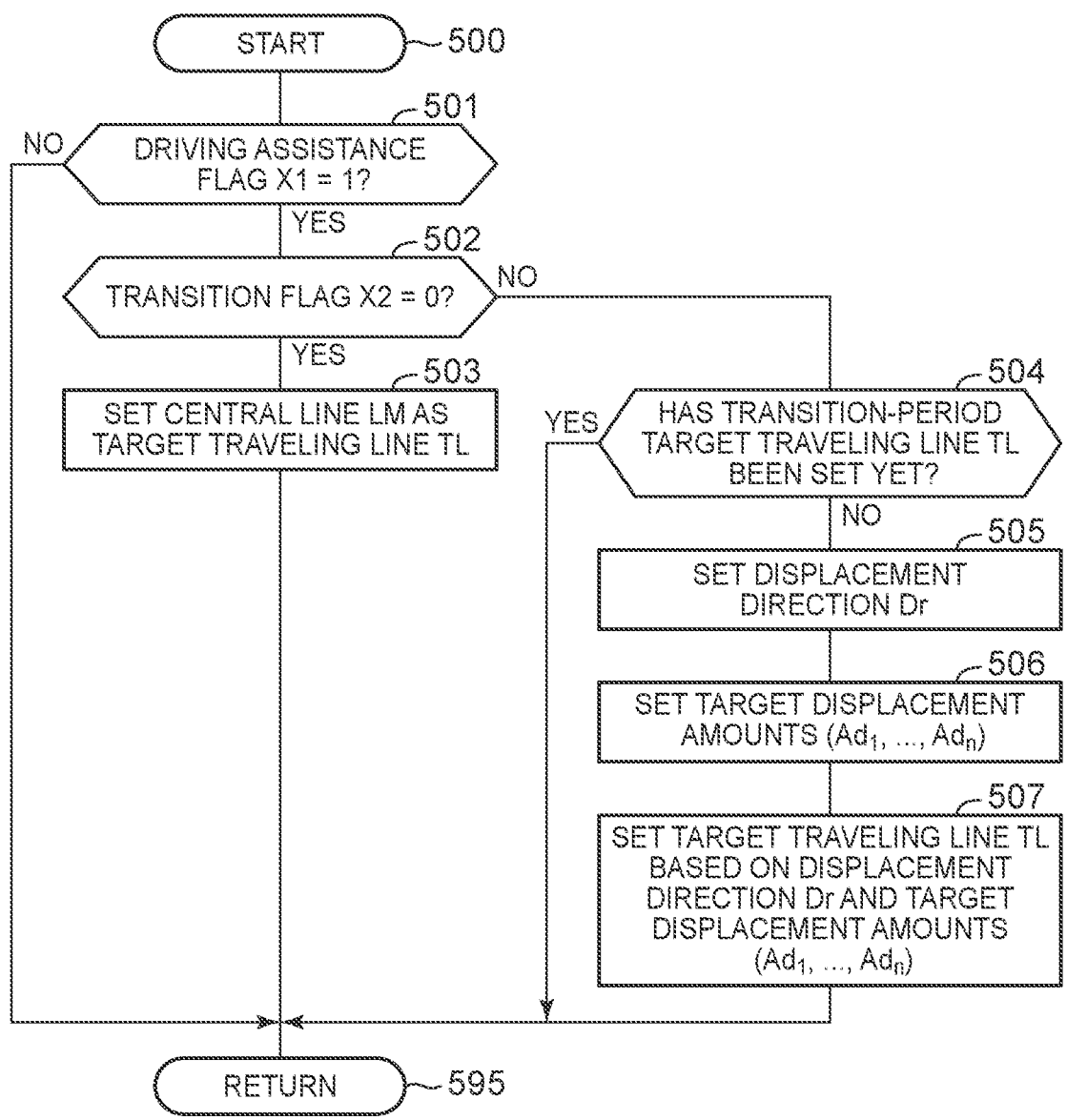
FIG. 5 is a flowchart illustrating "target traveling line setting routine" to be executed by the driving assistance ECU according to the first embodiment.

The CPU executes "target traveling line setting routine" illustrated in a flowchart of FIG. 5 every time a predetermined time has elapsed. At a predetermined timing, the CPU starts the processes from Step 500 of FIG. 5, and proceeds to Step 501. The CPU determines whether the value of the driving assistance flag X1 is "1". When the value of the driving assistance flag X1 is not "1", the CPU determines "No" in Step 501, and proceeds directly to Step 595 to temporarily terminate this routine.

When the value of the driving assistance flag X1 is "1", the CPU determines "Yes" in Step 501, and proceeds to Step 502. The CPU determines whether the value of the transition flag X2 is "0". When the value of the transition flag X2 is "0", the CPU determines "Yes" in Step 502, and proceeds to Step 503. The CPU sets the central line LM as the target traveling line TL. Then, the CPU proceeds to Step 595 to temporarily terminate this routine.

When the value of the transition flag X2 is not "0", the current timing is in the transition period. In this case, the CPU determines "No" in Step 502, and proceeds to Step 504. The CPU determines whether the transition-period target traveling line TL has already been set. Assuming that the current timing is a timing immediately after the switching to the transition period, the transition-period target traveling line TL has not been set yet. In this case, the CPU determines "No" in Step 504, and sequentially performs the following processes of Step 505 to Step 507. Then, the CPU proceeds to Step 595 to temporarily terminate this routine.

Step 505: The CPU sets the rightward direction as the displacement direction Dr as described above.

Step 506: The CPU sets the target displacement amounts Ad ($Ad_1, \ldots, Ad_n$) as described above.

Step 507: The CPU sets the transition-period target traveling line TL based on the displacement direction Dr and the target displacement amounts Ad ($Ad_1, \ldots, Ad_n$) as described above.

When the CPU proceeds to Step 504 after the transition-period target traveling line TL is set, the CPU determines "Yes", and proceeds directly to Step 595 to temporarily terminate this routine.

Figure 6:
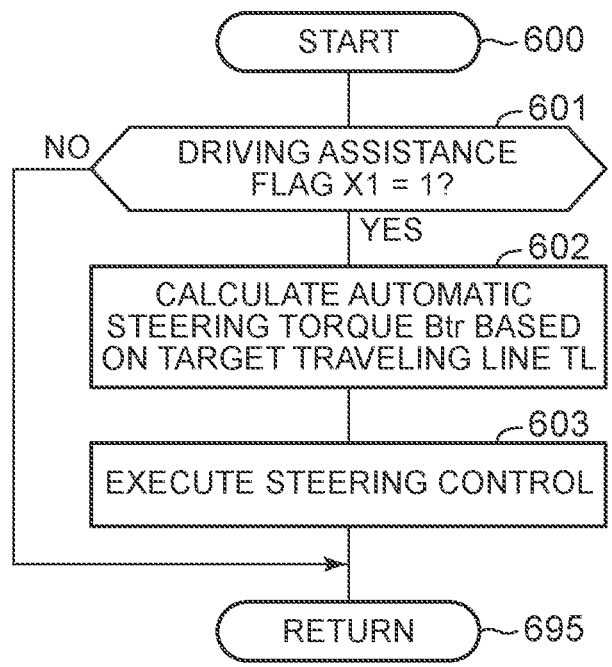
FIG. 6 is a flowchart illustrating "steering control execution routine" to be executed by the driving assistance ECU according to the first embodiment.

The CPU executes "steering control execution routine" illustrated in a flowchart of FIG. 6 every time a predetermined time has elapsed. At a predetermined timing, the CPU starts the processes from Step 600 of FIG. 6, and proceeds to Step 601. The CPU determines whether the value of the driving assistance flag X1 is "1".

When the value of the driving assistance flag X1 is not "1", the CPU determines "No" in Step 601, and proceeds directly to Step 695 to temporarily terminate this routine.

When the value of the driving assistance flag X1 is "1", the CPU determines "Yes" in Step 601, and sequentially performs the following processes of Step 602 and Step 603. Then, the CPU proceeds to Step 695 to temporarily terminate this routine.

Step 602: The CPU calculates the automatic steering torque Btr based on the target traveling line TL as described above. The CPU calculates the automatic steering torque Btr based on Expression 1.

Step 603: The CPU executes the steering control so that the actual torque applied to the steering mechanism 42 is equal to the automatic steering torque Btr.

As described above, when the driving assistance operation status is ON and the driving switching request is made, the first system sets, as the transition-period target traveling line TL, a line displaced from the central line LM in the displacement direction Dr (=rightward direction). When the vehicle VA travels along the transition-period target traveling line TL, the predetermined distance (for example, Da/2) is secured as the distance between the right-side surface of the vehicle VA and the right lane marking line RL. Thus, the driver can be prompted to operate the steering wheel SW while preventing an excessive increase in the lateral movement amount of the vehicle VA.

Modified Example 1 of First System

The displacement direction Dr may be preset to the leftward direction. When a national traffic law provides for right-hand traffic or left-hand traffic of the vehicle VA, the displacement direction Dr may be preset based on the traffic law.

Modified Example 2 of First System

Figure 7:
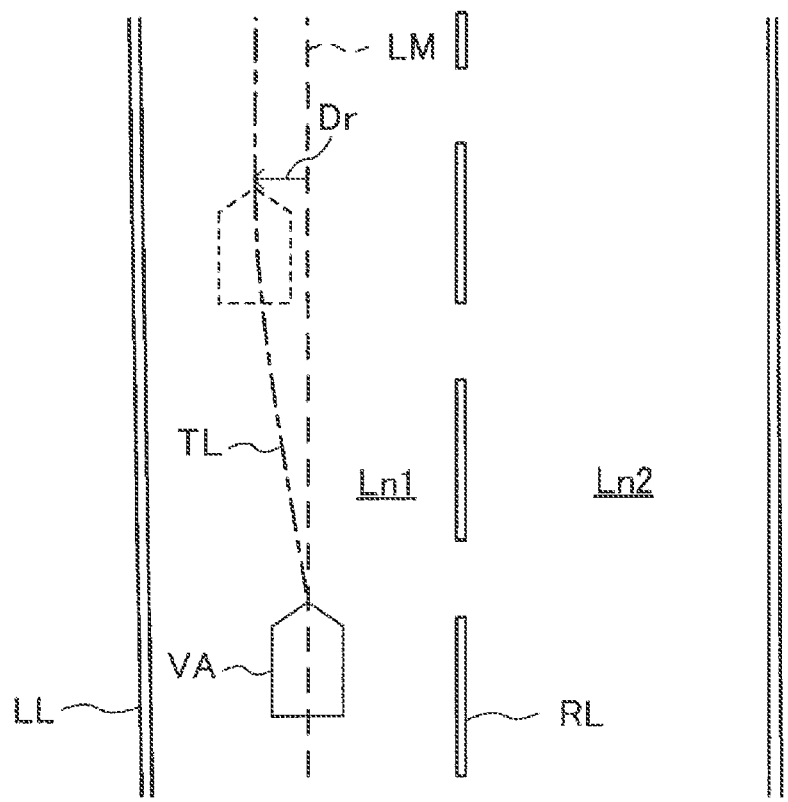
FIG. 7 is a plan for describing a modified example of the method for setting the target traveling line when the driving switching request is made.

The CPU according to Modified Example 2 changes the displacement direction Dr depending on surrounding conditions of the vehicle VA. For example, the CPU determines in Step 505 whether a first condition is satisfied based on lane information (or map information). The first condition is satisfied when an adjacent lane (not an oncoming lane but a lane where vehicles travel in the same direction) is present only on a right side or a left side of the lane where the vehicle VA is traveling. In an example illustrated in FIG. 7, the vehicle VA is traveling along a first lane Ln1, and a second lane Ln2 is present on a right side of the first lane Ln1. Since the adjacent lane (second lane Ln2) is present only on the right side of the first lane Ln1, the CPU determines that the first condition is satisfied. In this case, the CPU sets, as the displacement direction Dr, the rightward direction or the leftward direction that is opposite to the direction in which the adjacent lane (second lane Ln2) is present. That is, the CPU sets the leftward direction as the displacement direction Dr.

When the vehicle VA is traveling along one lane (first lane Ln1) of a road having two lanes, another vehicle may travel along an adjacent lane (second lane Ln2) from behind the vehicle VA. Therefore, when the vehicle VA laterally moves toward the adjacent lane, the driver may feel anxiety. According to Modified Example 2, the possibility of driver's anxiety can be reduced in this situation.

Also when three or more lanes where vehicles travel in the same direction are present, the CPU may determine in Step 505 whether the first condition is satisfied. When the vehicle VA is traveling along a rightmost lane or a leftmost lane, an adjacent lane is present only on a right side or a left side of the lane where the vehicle VA is traveling. Therefore, the CPU determines that the first condition is satisfied. In this case, the CPU sets, as the displacement direction Dr, a direction that is opposite to the direction in which the adjacent lane is present.

When adjacent lanes are present on both right and left sides of the lane where the vehicle VA is traveling, the CPU sets the predetermined rightward direction as the displacement direction Dr.

Modified Example 3 of First System

The CPU according to Modified Example 3 determines in Step 505 whether a second condition is satisfied based on lane information and target information. The second condition is satisfied when an adjacent lane is present only on a right side or a left side of the lane where the vehicle VA is traveling and any object (moving object such as a four-wheel vehicle or a two-wheel vehicle) is present on the adjacent lane. For example, it is assumed that the adjacent lane is present only on a right side of the lane where the vehicle VA is traveling and another vehicle is present on the adjacent lane. In this case, the second condition is satisfied. The CPU sets, as the displacement direction Dr, the rightward direction or the leftward direction that is opposite to the direction to the adjacent lane where the object is present. That is, the CPU sets the leftward direction as the displacement direction Dr. According to this configuration, when any object is actually present on the adjacent lane, the vehicle VA moves in the direction that is opposite to the direction in which the adjacent lane is present. When no object is present on the adjacent lane, the CPU sets the predetermined rightward direction as the displacement direction Dr.

In another example, it is assumed that adjacent lanes are present on both right and left sides of the lane where the vehicle VA is traveling. In this case, the CPU may determine whether a third condition is satisfied. The third condition is satisfied when no object is present on a lane located on the right side or the left side of the lane where the vehicle VA is traveling and any object is present on the other lane. In this case, the CPU may set, as the displacement direction Dr, a direction that is opposite to the direction to the adjacent lane where the object is present.

Modified Example 4 of First System

The CPU according to Modified Example 4 sets the displacement direction Dr to the predetermined direction (that is, the rightward direction) similarly to the first system. Based on lane information and target information, the CPU determines whether an adjacent lane is present to adjoin, on a side in the displacement direction Dr, the lane where the vehicle VA is traveling and any object (moving object) is present on the adjacent lane. It is assumed that an adjacent lane is present to adjoin, on the side in the displacement direction Dr, the lane where the vehicle VA is traveling. In this case, the CPU sets target displacement amounts $(Ad_i, \ldots, Ad_n)$ in the period from the timing $t_i$ to the timing $t_n$ when any object is present on the adjacent lane to a value smaller than that of target displacement amounts $(Ad_i, \ldots, Ad_n)$ when no object is present on the adjacent lane. For example, when no object is present on the adjacent lane, the CPU sets the target displacement amounts $(Ad_i, \ldots, Ad_n)$ in the period from the timing $t_i$ to the timing $t_n$ to a first value (for example, half of Da). When any object is present on the adjacent lane, the CPU sets the target displacement amounts $(Ad_i, \ldots, Ad_n)$ in the period from the timing $t_i$ to the timing $t_n$ to a second value (for example, ⅓ of Da) smaller than the first value.

In an example illustrated in FIG. 8, the vehicle VA is traveling along the first lane Ln1. The second lane Ln2 is present to adjoin the first lane Ln1, and another vehicle VB is traveling along the second lane Ln2. In Step 505, the CPU sets the rightward direction as the displacement direction Dr. Therefore, the adjacent lane (second lane Ln2) is present to adjoin, on a side in the displacement direction Dr, the first lane Ln1 where the vehicle VA is traveling, and any object (other vehicle VB) is present on the adjacent lane. In this case, the CPU sets the target displacement amounts $(Ad_i, \ldots, Ad_n)$ in the period from the timing $t_i$ to the timing $t_n$ to the second value in Step 506.

When no adjacent lane is present to adjoin, on the side in the displacement direction Dr, the lane where the vehicle VA is traveling, the CPU sets the target displacement amounts $(Ad_i, \ldots, Ad_n)$ in the period from the timing $t_i$ to the timing $t_n$ to the first value.

Modified Example 5 of First System

In Step 506, the CPU may set the target displacement amounts $(Ad_1, \ldots, Ad_n)$ to secure a predetermined distance Dth as the distance between the right-side surface of the vehicle VA and the lane marking line present on the side in the displacement direction Dr (right lane marking line RL in the example of FIG. 3). In the example of FIG. 3, the CPU may set the target displacement amounts $(Ad_i, \ldots, Ad_n)$ in the period from the timing $t_i$ to the timing $t_n$ to "Da–Dth". For example, the distance Dth may be set to ⅙ or ⅛ of a distance Wln between the right lane marking line RL and the left lane marking line LL (that is, a width of the lane). In another example, the distance Dth may be set to ⅓ or ¼ of the distance Da. In still another example, the CPU may set the target displacement amounts $(Ad_i, \ldots, Ad_n)$ in the period from the timing $t_i$ to the timing $t_n$ to a predetermined value Dc. According to this configuration, the vehicle VA always travels through the same displaced position (position spaced away from the central line LM by Dc) irrespective of the width Wln of the lane. Thus, the driver can feel safety.

Modified Example 6 of First System

The timing when the vehicle VA reaches the first displaced position (position spaced away from the central line LM in the displacement direction Dr by "Da/2") is not limited to the timing in the examples described above (timing $t_i$). In Step 506, the CPU may set the target displacement amounts $(Ad_1, \ldots, Ad_n)$ so that the vehicle VA reaches the first displaced position at an arbitrary timing prior to the timing $t_n$. For example, the target displacement amounts $(Ad_1, \ldots, Ad_n)$ may be set so that the vehicle VA reaches the first displaced position at a timing $t_k$ when "Tmth×¾" has elapsed from the timing to, and afterwards the vehicle VA travels along the first displaced positions. In another example, the target displacement amounts $(Ad_1, \ldots, Ad_n)$ may be set so that the vehicle VA reaches the first displaced position at a timing earlier than the timing $t_i$.

Modified Example 7 of First System

In Step 507, the CPU according to Modified Example 7 may set the target traveling line TL as illustrated in FIG. 9. The CPU sets, to "Da/2", the target displacement amount Ad$_i$ at the timing t$_i$ when "Tmth/2" has elapsed from the timing t$_0$. Further, the CPU sets, to "0", a target displacement amount Ad$_k$ at the timing t$_k$ when "Tmth/4" has elapsed from the timing t$_i$. The target displacement amount Ad$_k$ is a displacement amount from the central line LM at a position ahead of the position P0 by a distance "SPD×Tmth×¾". In addition, the CPU sets, to "Da/2", the target displacement amount Ad$_n$ at the timing t$_n$ when "Tmth/4" has elapsed from the timing t$_k$ (that is, the end timing of the transition period).

Then, the CPU sets the target displacement amounts (Ad$_1$, ..., Ad$_i$) in the period from the timing t$_1$ to the timing t$_i$. The values of the target displacement amounts (Ad$_1$, ..., Ad$_i$) are set so that the value gradually increases from "0" with an elapse of time and the value at the timing t$_i$ (Ad$_i$) is "Da/2".

Then, the CPU sets target displacement amounts (Ad$_{i+1}$, ..., Ad$_k$) in a period from the timing t$_{i+1}$ to the timing t$_k$. The values of the target displacement amounts (Ad$_{i+1}$, ..., Ad$_k$) are set so that the value gradually decreases from "Da/2" with an elapse of time and the value at the timing t$_k$ (Ad$_k$) is "0".

Then, the CPU sets target displacement amounts (Ad$_{k+1}$, ..., Ad$_n$) in a period from a timing t$_{k+1}$ to the timing t$_n$. The values of the target displacement amounts (Ad$_{k+1}$, ..., Ad$_n$) are set so that the value gradually increases from "0" with an elapse of time and the value at the timing t$_n$ (Ad$_n$) is "Da/2".

The CPU sets, as the target traveling line TL, a line (second line) displaced from the central line LM (first line) based on the target displacement amounts (Ad$_1$, ..., Ad$_n$). As illustrated in FIG. 9, the transition-period target traveling line TL is a meandering line. According to this configuration, the vehicle VA travels through the first displaced position at the timing t$_i$, and then travels through a position on the central line LM at the timing t$_k$. The vehicle VA travels through the first displaced position again at the timing t$_n$. Since the vehicle VA laterally moves multiple times, the driver can be prompted more noticeably to operate the steering wheel SW.

A "magnitude of lateral movement amount of vehicle VA per unit time" from the timing t$_i$ to the timing t$_k$ is larger than a "magnitude of lateral movement amount of vehicle VA per unit time" from the timing to t$_0$ the timing t$_i$. Further, a "magnitude of lateral movement amount of vehicle VA per unit time" from the timing t$_k$ to the timing t$_n$ is larger than the "magnitude of lateral movement amount of vehicle VA per unit time" from the timing t$_0$ to the timing t$_i$. In Modified Example 7 of the first system, the driver is easily aware of the lateral movement of the vehicle VA after the timing t$_i$. Thus, the driver can be prompted to operate the steering wheel SW.

The CPU may set the target displacement amount Ad$_k$ at the timing t$_k$ to a value larger than "0" and smaller than "Da/2" (for example, Da/3). In this case, the vehicle VA travels through the first displaced position at the timing t$_i$, and then travels through a position near the central line LM at the timing t$_k$. The vehicle VA travels through the first displaced position again at the timing t$_n$.

The CPU may set the target displacement amount Ad$_n$ at the timing t$_n$ to a value larger than the target displacement amount Ad$_i$ at the timing t$_i$. For example, the CPU sets the target displacement amount Ad$_i$ to a value smaller than "Da/2", and sets the target displacement amount Ad$_n$ to "Da/2". According to this configuration, the magnitude of the lateral movement amount of the vehicle VA from the timing t$_k$ to the timing t$_n$ is larger than the magnitude of the lateral movement amount of the vehicle VA from the timing t$_0$ to the timing t$_i$. Further, the "magnitude of lateral movement amount of vehicle VA per unit time" from the timing t$_k$ to the timing t$_n$ is larger than the "magnitude of lateral movement amount of vehicle VA per unit time" from the timing t$_0$ to the timing t$_i$. Thus, the driver can be prompted more effectively to operate the steering wheel SW.

Second Embodiment

Next, a vehicle control system according to a second embodiment (may hereinafter be referred to as "second system") is described. The second system differs from the first system in that the second system determines whether the vehicle VA is expected to travel along a curve (zone of a curved road) in the transition period and sets the displacement direction Dr based on the determination result.

Figure 10:
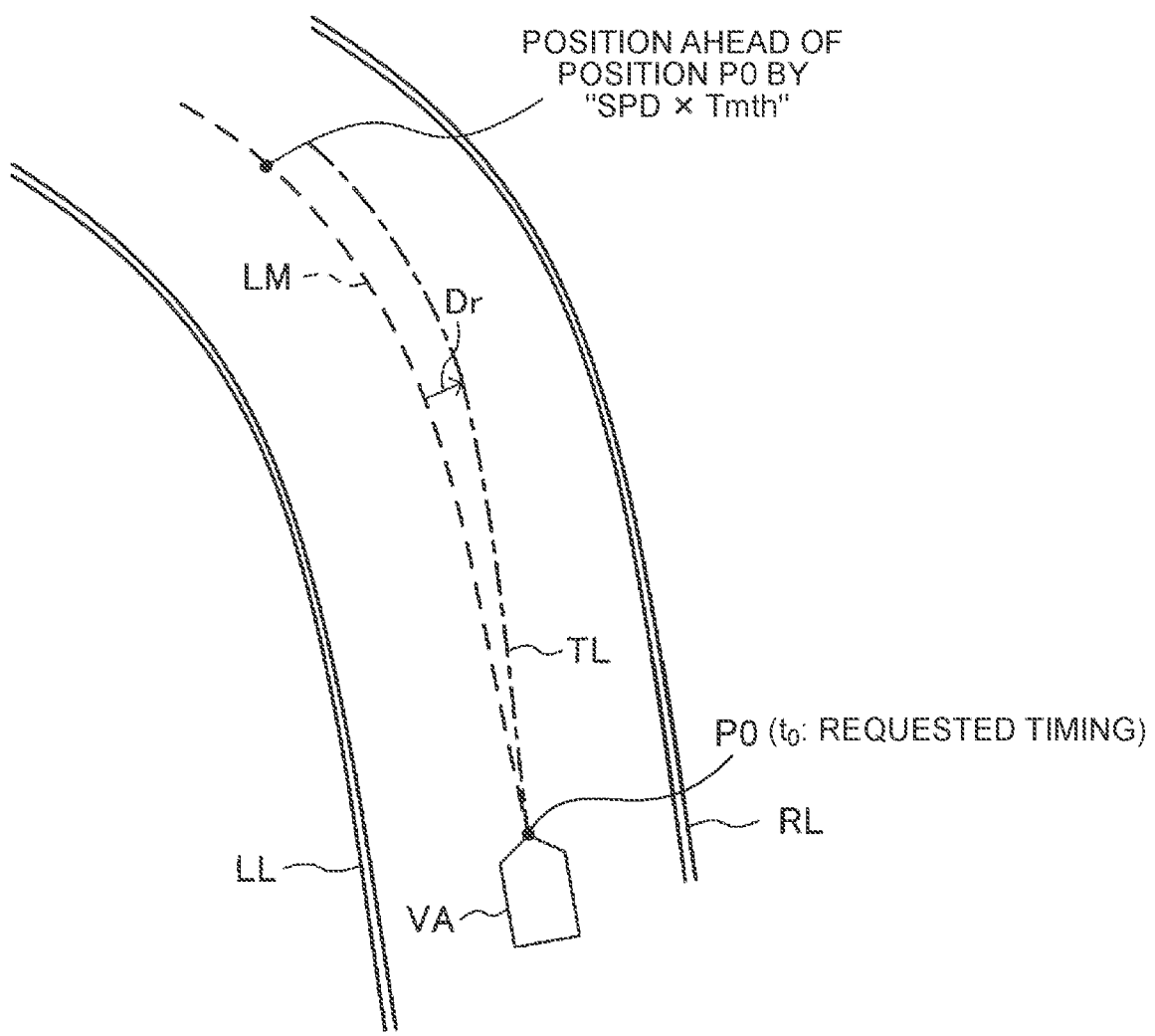
FIG. 10 is a plan for describing an example of a method for setting the target traveling line when the driving switching request is made according to a second embodiment.

When the driving switching request is made, the driving assistance ECU 10 of the second system determines whether the vehicle VA is expected to travel along a curve in the transition period. In an example illustrated in FIG. 10, it is assumed that the driving switching request is made at the timing t$_0$. The driving assistance ECU 10 acquires a curvature of the traveling lane at the end timing of the transition period based on lane information (or map information). Specifically, the driving assistance ECU 10 acquires a curvature CLn of the traveling lane at the position ahead of the position P0 at the timing t$_0$ by "SPD×Tmth". When the magnitude of the curvature CLn is larger than a predetermined curvature threshold CLth, the driving assistance ECU 10 determines that the vehicle VA is expected to travel along a curve in the transition period. In this case, the driving assistance ECU 10 also acquires information related to a direction of the curve (that is, a direction in which the curve runs, in other words, whether the curve is a rightward curve or a leftward curve).

When the driving assistance ECU 10 determines that the vehicle VA is expected to travel along the curve in the transition period, the driving assistance ECU 10 sets a direction opposite to the direction of the curve as the displacement direction Dr. In the example illustrated in FIG. 10, the direction of the curve is the leftward direction, and therefore the driving assistance ECU 10 sets the rightward direction as the displacement direction Dr.

In a situation in which the vehicle VA is traveling along a curve, a self-aligning torque may be generated in each tire. That is, a torque for causing the vehicle VA to travel straightforward again is generated in each tire. When the driving assistance operation status is set to OFF while the vehicle VA is traveling along the curve, the vehicle VA is going to travel straightforward again due to the self-aligning torque. Therefore, the vehicle VA may suddenly move outward from the curve.

In the second system, the vehicle VA is displaced from the central line LM in a direction opposite to the direction of the curve (that is, a direction corresponding to an outward direction of the curve) before the driving assistance operation status is set to OFF. Since the vehicle VA is displaced outward from the curve, the driver can be prompted to operate the steering wheel SW in a direction corresponding to an inward direction of the curve. In response to the displacement of the vehicle VA, the driver operates the steering wheel SW in the direction corresponding to the inward direction of the curve. That is, the driver operates the steering wheel SW in a direction in which the self-aligning torque is canceled out. Thus, it is possible to reduce the possibility that the vehicle VA suddenly moves outward from the curve when the driving assistance operation status is set to OFF.

Operation Example

Figure 11:
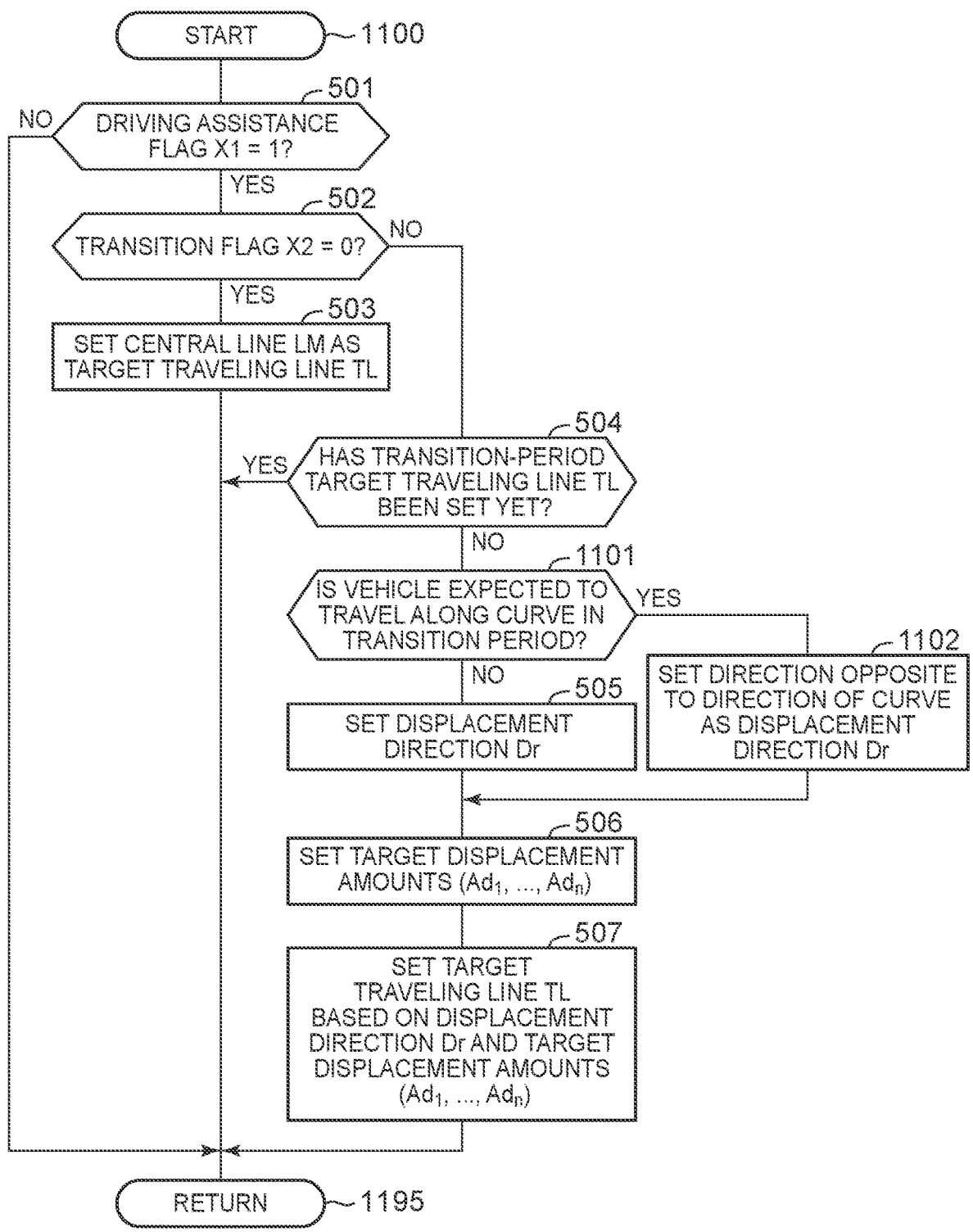
FIG. 11 is a flowchart illustrating "target traveling line setting routine" to be executed by the driving assistance ECU according to the second embodiment.

The second system differs from the first system in that the CPU of the driving assistance ECU 10 (referred to simply as "CPU") executes "target traveling line setting routine" of FIG. 11 in place of the routine of FIG. 5 every time a predetermined time has elapsed. This difference is mainly described below. The routine of FIG. 11 is implemented by adding Step 1101 and Step 1102 after Step 504 of the routine of FIG. 5. Therefore, detailed description is omitted for steps having the same reference symbols as those in FIG. 5.

At a predetermined timing, the CPU starts the processes from Step 1100 of FIG. 11. The CPU determines "No" in Step 504, and proceeds to Step 1101. In Step 1101, the CPU determines whether the vehicle VA is expected to travel along a curve in the transition period.

When the CPU determines that the vehicle VA is not expected to travel along a curve in the transition period, the CPU determines "No" in Step 1101, and sequentially executes the processes of Step 505 to Step 507 as described above. Then, the CPU proceeds to Step 1195 to temporarily terminate this routine.

When the CPU determines that the vehicle VA is expected to travel along a curve in the transition period, the CPU determines "Yes" in Step 1101, and proceeds to Step 1102. In Step 1102, the CPU sets a direction opposite to the direction of the curve as the displacement direction Dr. Then, the CPU sequentially executes the processes of Step 506 and Step 507 as described above. Then, the CPU proceeds to Step 1195 to temporarily terminate this routine.

As described above, when the second system determines that the vehicle VA is expected to travel along a curve in the transition period, the second system sets a direction opposite to the direction of the curve as the displacement direction Dr. Since the vehicle VA is displaced outward from the curve before the driving assistance operation status is set to OFF, the driver can be prompted to operate the steering wheel SW in a direction in which the self-aligning torque is canceled out (that is, an inward direction of the curve). Thus, it is possible to reduce the possibility that the vehicle VA suddenly moves outward from the curve when the driving assistance operation status is set to OFF.

Modified Example 1 of Second System

At the timing when the driving switching request is made, the driving assistance ECU 10 according to Modified Example 1 may acquire, as the curvature of the traveling lane, a curvature of the central line LM at a position ahead of the vehicle VA by a predetermined distance. When the magnitude of the curvature of the central line LM is larger than the predetermined curvature threshold CLth, the driving assistance ECU 10 may determine that the vehicle VA is expected to travel along a curve in the transition period.

Modified Example 2 of Second System

The driving assistance ECU 10 according to Modified Example 2 may determine whether the vehicle VA is traveling along a curve based on the acceleration Gy acquired by the second acceleration sensor 17 at the timing when the driving switching request is made. When the vehicle VA is traveling along a curve at the timing when the driving switching request is made, the driving assistance ECU 10 may determine that the vehicle VA is expected to travel along a curve in the transition period.

Modified Example 3 of Second System

The processes in Modified Example 4 to Modified Example 7 of the first system may be applied to the routine of FIG. 11.

The present disclosure is not limited to the embodiments and the modified examples described above, and various modified examples may be adopted within the scope of the present disclosure.

The configurations of the first embodiment and the second embodiment described above are applicable not only to the vehicle control system configured to execute the LKA, but also to a vehicle control system configured to execute autonomous driving control for autonomously controlling, for example, the acceleration of the vehicle and the steered angle of each steered wheel (control having an autonomous driving level higher than that of the LKA).

What is claimed is:

1. A vehicle control system comprising:
   at least one sensor configured to acquire vehicle surrounding information containing information related to a right lane marking line and a left lane marking line defining a traveling lane where a vehicle is traveling; and
   a controller configured to:
   set a target traveling line based on the vehicle surrounding information; and
   execute driving assistance control including at least steering control for changing a steered angle of the vehicle to cause the vehicle to travel along the target traveling line, wherein
   the controller is configured such that, when an operation status of the driving assistance control is ON, a first line connecting first positions in a width direction of the traveling lane defined based on the right lane marking line and the left lane marking line is set as the target traveling line,
   the controller is configured such that, when a driving switching request is made to request a change of the operation status of the driving assistance control from ON to OFF in a case where the operation status of the driving assistance control is ON, the target traveling line after a requested timing that is a timing when the driving switching request is made is set to cause the vehicle to travel along a second line displaced from the first line in a displacement direction that is a rightward direction or a leftward direction of the vehicle by a predetermined displacement amount after a specific timing that is a timing when a predetermined time has elapsed from the requested timing,
   the controller is configured to continue the driving assistance control in a period from the requested timing to a timing when a predetermined termination condition is satisfied, and
   the controller is configured such that, when the driving switching request is made, the target traveling line is set to cause the vehicle to:
   travel through a position spaced away from the first line in the displacement direction by a first displacement amount at a first timing when a first time has elapsed from the requested timing;
   travel through a position spaced away from the first line in the displacement direction by a second displacement amount at a second timing when a second time has elapsed from the first timing; and
   travel through a position spaced away from the first line in the displacement direction by a third displacement amount at a third timing when a third time has elapsed from the second timing, and the second displacement amount is smaller than the first displacement amount and the third displacement amount, and the first displacement amount is equal to or smaller than the third displacement amount.

2. The vehicle control system according to claim 1, wherein the controller is configured to set the predetermined displacement amount to secure a distance equal to or larger than a predetermined distance threshold as a distance between a side surface of the vehicle on a side in the displacement direction and the right lane marking line or the left lane marking line present on the side in the displacement direction.

3. The vehicle control system according to claim 1, wherein the controller is configured to preset, as the displacement direction, the rightward direction or the leftward direction based on a traffic law in an area where the vehicle is traveling.

4. The vehicle control system according to claim 1, wherein:

the at least one sensor is configured to acquire, as the vehicle surrounding information, information related to an adjacent lane adjoining the traveling lane;

the controller is configured to determine whether a first condition that the adjacent lane is present only on a right side or a left side of the traveling lane is satisfied at the requested timing; and the controller is configured such that, when the controller determines that the first condition is satisfied at the requested timing, the rightward direction or the leftward direction that is opposite to a direction in which the adjacent lane is present is set as the displacement direction.

5. The vehicle control system according to claim 1, wherein:

the at least one sensor is configured to acquire, as the vehicle surrounding information, information related to an adjacent lane adjoining the traveling lane, and information related to an object present on the adjacent lane;

the controller is configured to determine whether a second condition that the adjacent lane is present only on a right side or a left side of the traveling lane and the object is present on the adjacent lane is satisfied at the requested timing; and the controller is configured such that, when the controller determines that the second condition is satisfied at the requested timing, the rightward direction or the leftward direction that is opposite to a direction in which the adjacent lane is present is set as the displacement direction.

6. The vehicle control system according to claim 1, wherein:

the at least one sensor is configured to acquire, as the vehicle surrounding information, information related to an adjacent lane adjoining the traveling lane, and information related to an object present on the adjacent lane;

the controller is configured to preset the rightward direction or the leftward direction as the displacement direction; and the controller is configured such that, when the adjacent lane is present on a side in the displacement direction, the predetermined displacement amount when the object is present on the adjacent lane is set to a value smaller than a value of the predetermined displacement amount when the object is not present on the adjacent lane.

7. The vehicle control system according to claim 1, wherein:

the controller is configured to determine whether the vehicle is expected to travel along a curve in a period from the requested timing to a timing when a time corresponding to a predetermined time threshold has elapsed; and the controller is configured such that, when the controller determines that the vehicle is expected to travel along the curve in the period, the rightward direction or the leftward direction that is opposite to a direction in which the curve runs is set as the displacement direction.

8. The vehicle control system according to claim 1, wherein the first position is a central position between the right lane marking line and the left lane marking line in the width direction of the traveling lane.

* * * * *